United States Patent [19]

Cadwell

[11] 4,326,921
[45] Apr. 27, 1982

[54] CONTROL ROD GUIDE THIMBLE FOR NUCLEAR REACTOR FUEL ASSEMBLIES

[75] Inventor: Dennis J. Cadwell, Plum Borough, Pa.

[73] Assignee: Westinghouse Electric Corp., Pittsburgh, Pa.

[21] Appl. No.: 150,482

[22] Filed: May 16, 1980

[51] Int. Cl.³ .................................................. G21C 3/30
[52] U.S. Cl. ..................................... 376/353; 376/449
[58] Field of Search ................................. 176/76, 78

[56] References Cited

U.S. PATENT DOCUMENTS

| | | | |
|---|---|---|---|
| 3,791,466 | 2/1974 | Patterson | 176/78 |
| 3,814,667 | 6/1974 | Klumb | 176/87 |
| 4,030,975 | 6/1977 | Anthony | 176/78 |
| 4,135,972 | 1/1979 | Anthony | 176/78 |
| 4,208,248 | 6/1980 | Jabsen | 176/78 |

Primary Examiner—Donald P. Walsh
Attorney, Agent, or Firm—J. R. Campbell; Z. L. Dermer

[57] ABSTRACT

A design of fuel assembly control rod guide thimble which includes insets or indentations which project inwardly from the upper end of the guide thimble and extend longitudinally of the thimble for about the same distance traversed by a control rod movable therein. These preferentially formed discrete indented areas or insets within the guide thimble provide for controlled localized control rod to guide thimble wear. The insets minimize wear at the control rod-guide thimble interface by lowering the normal load and encouraging the control rod into a line contact wearing mode. Additional insets may be remotely installed after irradiation if desired.

5 Claims, 4 Drawing Figures

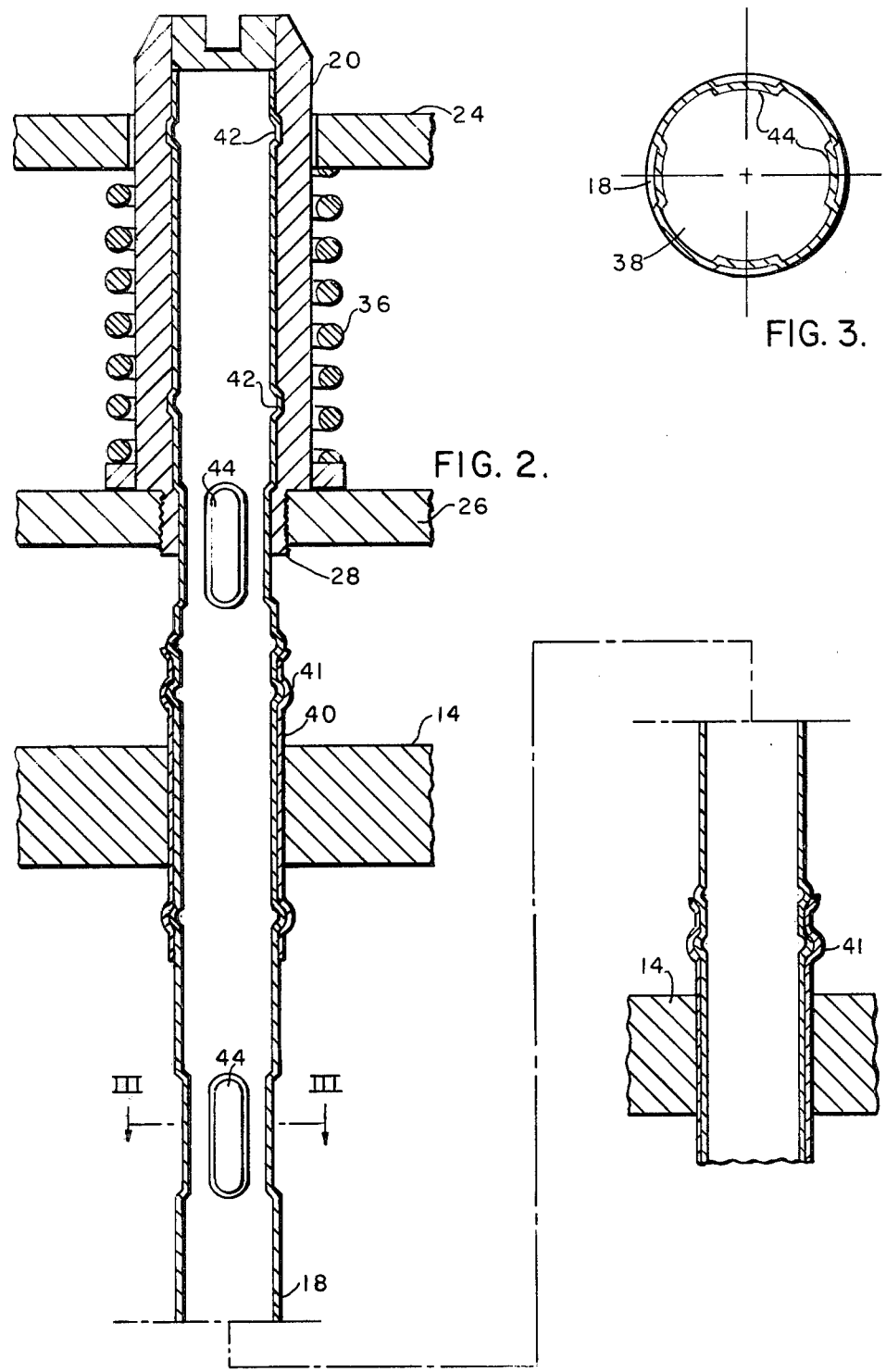

CONTROL ROD GUIDE THIMBLE FOR NUCLEAR REACTOR FUEL ASSEMBLIES

BACKGROUND OF THE INVENTION

The invention described herein relates to nuclear reactors and more particularly to improved control rod guide thimbles designed to minimize wear of control rods during reactor operation.

Commercial nuclear reactors of conventional design includes a core composed of multiple fuel assemblies. Each fuel assembly includes an array of fuel rods held in spaced relationship with each other by grids of egg-crate configuration spaced along the fuel rod length. Control rod guide tubes or thimbles interspersed among the fuel rods provide a pathway for control rods which reciprocate therein to control the fission process which takes place in the reactor. These guide thimbles are immovably connected to the longitudinally spaced grids and these components thus form the basic structural framework for each fuel assembly. To extract heat from the core, coolant is circulated upwardly in contact with the heat generating fuel rods from which it absorbs heat before being discharged from the reactor. Since the control rod guide thimbles are open at both lower and upper ends, a portion of the coolant also is circulated therethrough during reactor operation.

As the coolant flows at high velocity and pressure through the guide thimbles, it causes the control rods therein to vibrate and thus move laterally and cyclically into contact with the inner walls of the guide thimbles. It has been found that this action induces wear which occurs where the tip of the control rod interfaces with the guide thimble inner surfaces.

Close examination and analysis of the evidence of wear shows that a scar of triangular geometry occurs in the wear area. This geometry suggests that the control rod experienced lateral vibratory motion which caused wear at the point where point contact is made between the control rod spherical tip and inner walls of the guide thimble. More specifically, as the control rod vibrates, its tip penetrates progressively deeper into the guide thimble wall, and as the control rod slowly advances or moves upwardly during reactor operation, the point of control rod-guide thimble contact also moves upwardly. This effects a change in the wear scar in that it decreases in size and severity because the control rod lateral motion is less as it is withdrawn with changes in reactor reactivity. Nevertheless, inspection of guide thimbles exposed to wear as described above, showed that the guide thimble walls were worn through in some fuel assemblies while others had only partial circumferential wear.

Different designs of guide thimbles have been made to alleviate wear caused by the hydraulically induced vibration of the control rods in the guide thimbles. For example, application Ser. No. 102,046 filed Dec. 10, 1979 by S. Kmonk et al. and assigned to the same assignee as the present invention discloses the use of chromeplated stainless steel wear sleeves within the upper end of the guide thimble at the wear location to help minimize wear caused by the vibrating control rods.

SUMMARY OF THE INVENTION

Briefly stated, the above disadvantages of prior art designs are overcome by this invention by creating a series of local deformations in the form of indentations in the guide thimble and at positions where the control rod walls interface with the guide thimble walls. Such deformations serve to reduce the clearance between the control rod outer surface and the guide thimble inner surfaces and help to promote contact between the control rod walls and the indentations or insets to achieve line-versus-point contact between the interfacing parts.

BRIEF DESCRIPTION OF THE DRAWINGS

The specification concludes with claims particularly pointing out and distinctly claiming the subject matter of the invention. However, it is believed the invention will be better understood from the following description taken together with the accompanying drawings wherein:

FIG. 2 is a view in elevation, partly in section of a control rod guide thimble showing the design and location of insets formed along its length;

FIG. 3 is a view taken on lines III—III of FIG. 2 and further illustrating the degree of point contact made by the outer surface of a control rod with the exposed surface of the insets.

DESCRIPTION OF THE PREFERRED EMBODIMENT

Figure 1:
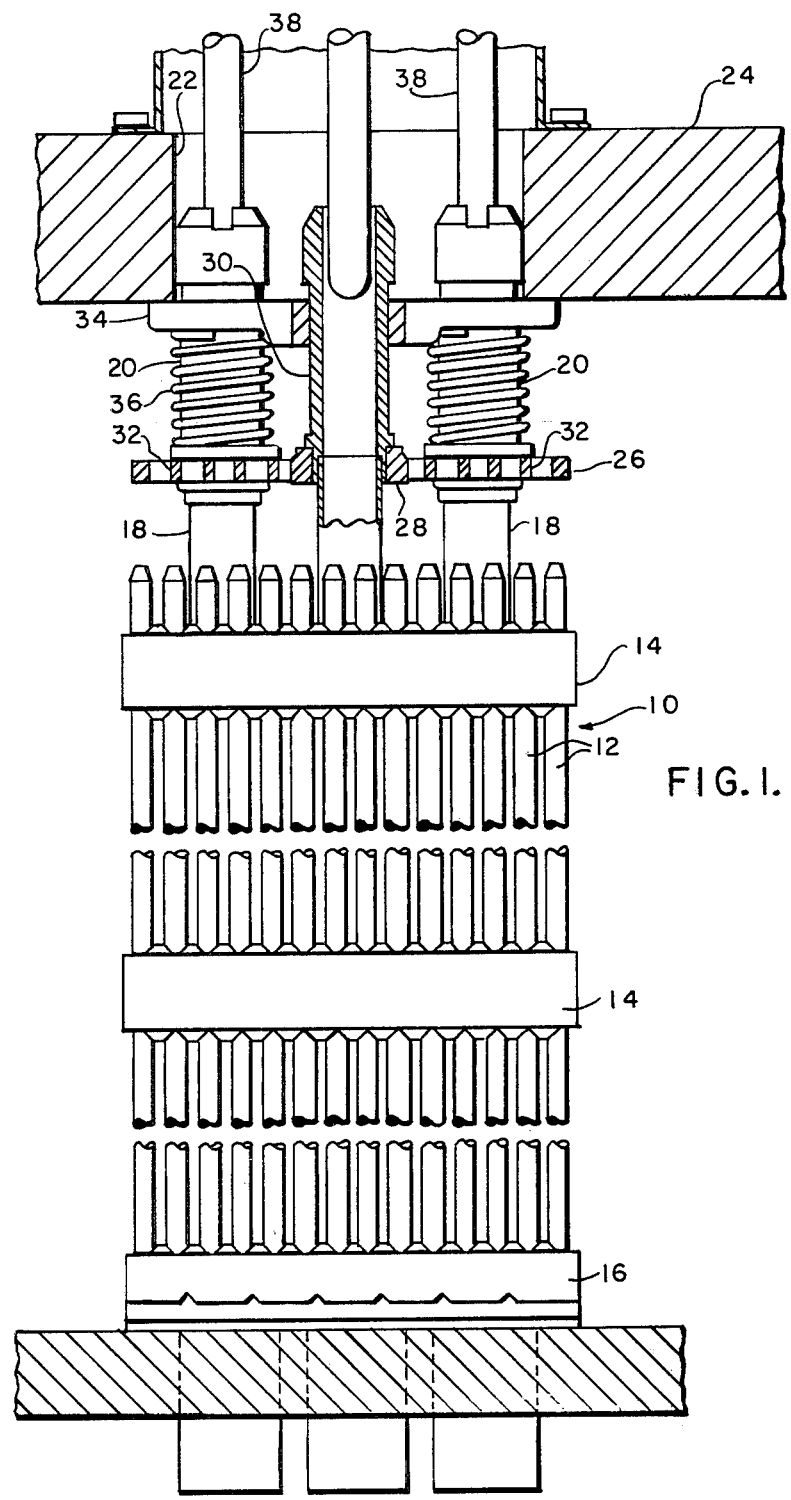
FIG. 1 is a view in elevation, partly in section of a fuel assembly showing the relationship of the invention to other parts in the assembly.

Referring now to the drawings wherein like reference characters designate like or corresponding parts throughout the several views, there is shown in FIG. 1 a conventional design of fuel assembly 10 including a square array of fuel rods 12 held in spaced relationship with each other by egg-crate grids 14 and a retention grid 16 at its base. The assembly may comprise a 14×14 square array of fuel rods of the type shown, for example, and extend for about 13 feet in length. The assembly includes control rod guide thimbles 18 which are interspersed among the fuel rods and appropriately secured to the grids by mechanical expansion of the material or welding in a well-known manner. The upper end of each guide thimble is fixed to an extension 20, as by screw threads, and the extension itself terminates in an opening 22 formed in upper core plate 24. An upper end plate 26 is immovably fixed by a locking arrangement 28 to the extension of a centrally disposed guide thimble 30, and to the extensions 20 on guide thimbles 18. Holddown plate 34 is movably mounted on central extension 30, as shown, and on extensions 20, and is biased into contact with the underside of core plate 24 by springs 36. This arrangement accommodates hydraulic lifting forces acting on the assembly together with those forces resulting from thermal growth of the assembly during reactor operation.

To control the fission process in each fuel assembly, control rods 38 driven from a common drive mechanism (not shown) are arranged for gradual insertion and withdrawal in the guide thimbles in a manner also well known in the art. At startup, the control rods are inserted to the minimum extent, i.e., about 12" into the upper end of the guide thimbles. During reactor operation, coolant circulated upwardly through the fuel assemblies, also flows through the guide thimbles which are open at both ends. Although a control rod is always positioned at some level in its corresponding guide thimble, the hydraulic forces imposed on the control rod by the coolant as it enters the space between the control rod and guide thimble inner walls and flows out the upper end, induce vibrations in the control rod of sufficient magnitude to cause wear of the guide thimble walls.

As indicated in the foregoing discussion, wear of the guide thimbles occurs at the point where the tip of a control rod interfaces with the guide thimble inner walls. As reactor operation takes place, the control rods are withdrawn to about twelve inches from the top of the assembly and remain there during the entire cycle, and are inserted at shutdown. Hydraulically induced vibrations over this time period cause wear along a substantial length of the guide thimble inner walls.

Figure 4:
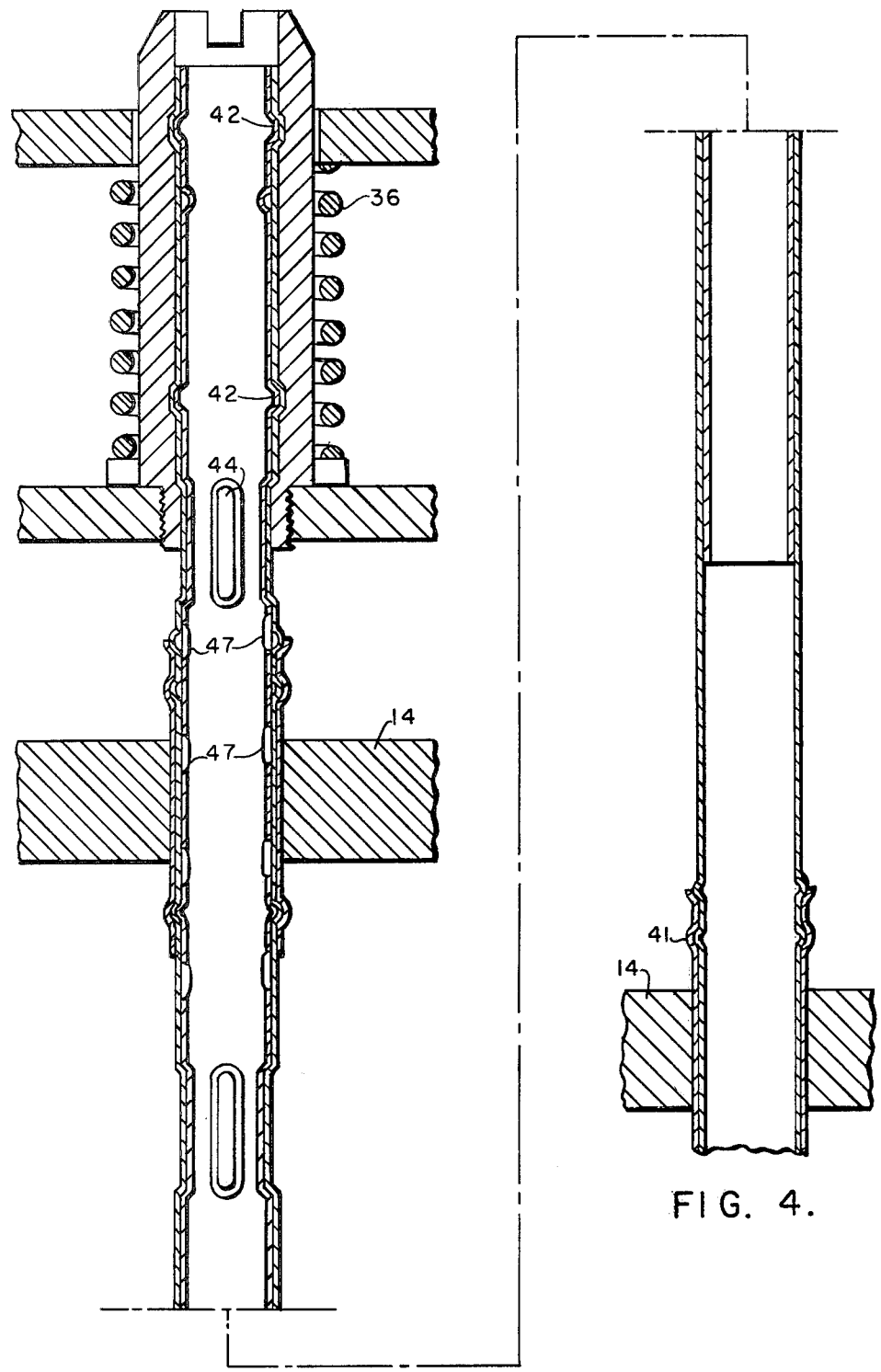
FIG. 4 is a modification of the invention illustrated in FIGS. 1-4.

FIGS. 2-4 illustrate an improved guide thimble designed to alleviate guide thimble wear during reactor operation. As shown, the guide thimble may be a Zircaloy or stainless steel tube 18 attached to grid 14 through the intermediary of a stainless steel sleeve 40. The sleeve and guide thimble material are expanded outwardly at 41 by a special tool both above and below the straps of each grid 14 to provide a relatively rigid skeleton structure for the fuel assembly and to prevent axial movement of the grids on the guide thimbles. Extension 20 is attached to the upper end of the guide thimble in much the same way by swaging the thimble material into grooves 42 machined in the extension inner walls.

To eliminate or substantially reduce wear between each control rod 38 and guide thimble inner walls, a series of local deformations or insets 44 are made in the guide thimble walls. They preferably are formed at 90° intervals around the guide thimble and are spaced along the guide thimble length at about six inch intervals. The insets or indentations made in the guide thimble walls are each about 1.32 inch long and about 0.32 inch wide and project inwardly from the guide thimble walls about 0.030 inch. With this radial reduction in space, the clearance between the control rod and guide thimble walls has been changed from 0.087 inch to 0.027 inch. This reduction in the local diametrical clearance serves to reduce the normal force caused by the lateral vibrating motion of the control rod on the guide thimble thus minimizing the opportunity for wear to take place. A major advantage derived from utilizing insets, and particuarly insets of the design disclosed herein is that they promote control rod wear, although minimal, against the insets in a line contact mode rather than point contact heretofore experienced in prior designs. The invention therefore minimizes wear by reducing the load or magnitude of forces available to act against the insets, and by encouraging line contact between the coacting parts. If necessary or desirable, additional insets can be remotely formed on the guide thimbles after irradiation in a reactor.

In the modification of FIG. 4, in lieu of forming insets directly in the guide thimble material, a stainless steel, or other material, tube or liner 46 may be inserted in the end of the guide thimble and for about 12-14 percent of its length. The liner is swaged into grooves 42 in the extensions. To provide line contact with the control rod, the liner material is deformed or indented inwardly in the same manner as that described in relation to FIGS. 2 and 3. The insets may be chrome plated to enhance the wear properties if deemed desirable or necessary.

It will be apparent that many modifications and variations are possible in light of the above teachings. It therefore is to be understood that within the scope of the appended claims, the invention may be practiced other than as specifically described.

I claim:

1. A fuel assembly for a nuclear reactor comprising an array of fuel rods held in spaced relationship with each other by a series of grids spaced along the fuel rod length, multiple control rod guide thimbles interspersed among the fuel rods extend the length of said assembly and are attached to said grids to provide a basic skeleton structure for the assembly, and an extension attached to the upper end of each of said guide thimbles;

insets in the form of local deformations in the guide thimble walls which project inwardly toward the guide thimble axis, said insets serving to reduce the force, and therefore the wear, caused by lateral vibrating motion between the guide thimble and control rod adapted to reciprocate therein.

2. The fuel assembly according to claim 1 wherein said insets are spaced at uniform intervals around the periphery of said guide thimble and along the guide thimble length.

3. The fuel assembly according to claim 2 wherein the length of each of said insets is approximately four times the inset width in order to promote line contact between said control rod and insets to thereby minimize wear of said guide thimble.

4. The fuel assembly according to claim 1 wherein said insets are formed on a liner secured to the inside of said guide thimble.

5. The fuel assembly according to claim 4 wherein said liner extends downwardly into said guide thimble for less than about 15 percent of the length of said guide thimble.

* * * * *